H. H. BATES.
TRACTOR.
APPLICATION FILED JULY 1, 1915.
1,196,507.
Patented Aug. 29, 1916.
3 SHEETS—SHEET 2.
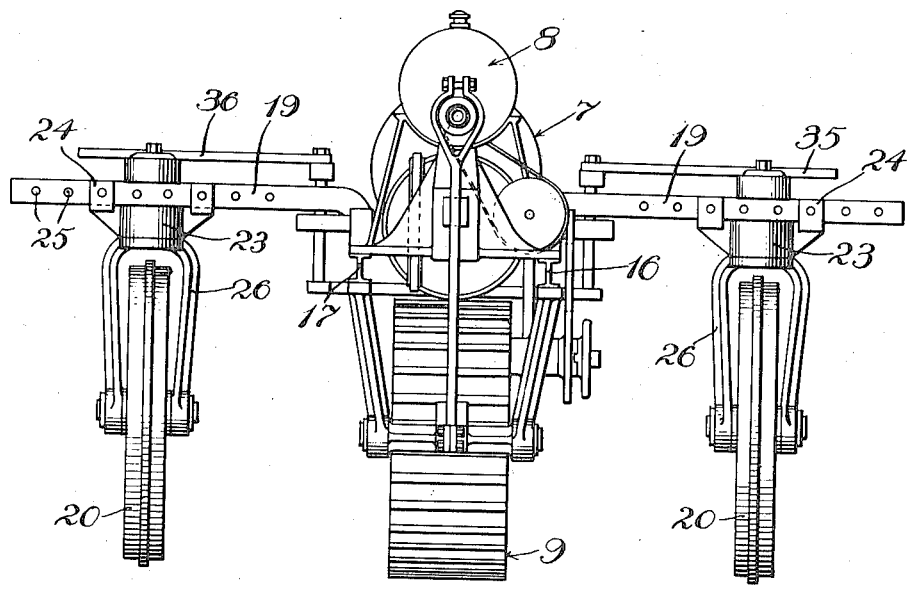
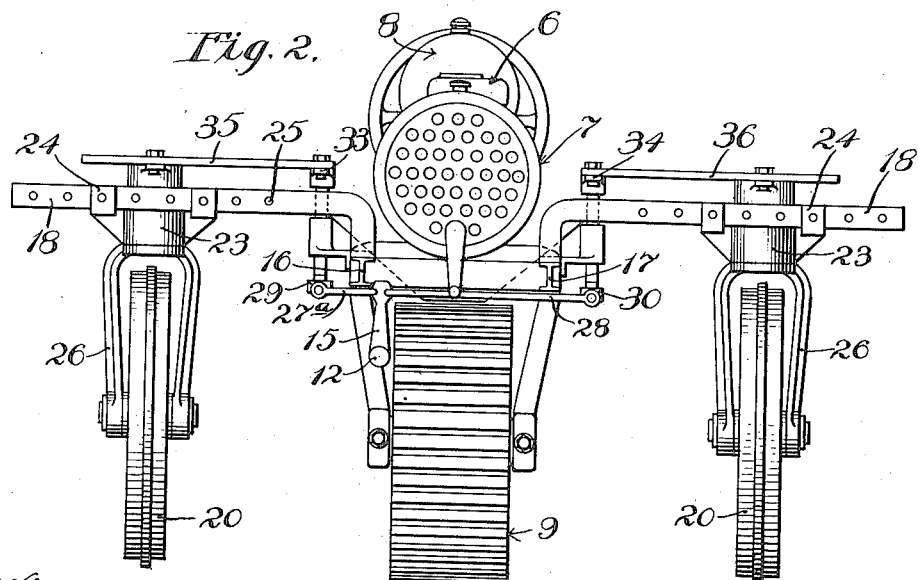
Witness:
H. S. Gaither
Inventor
Harry H. Bates
by Bannin & Bannin
Attys.

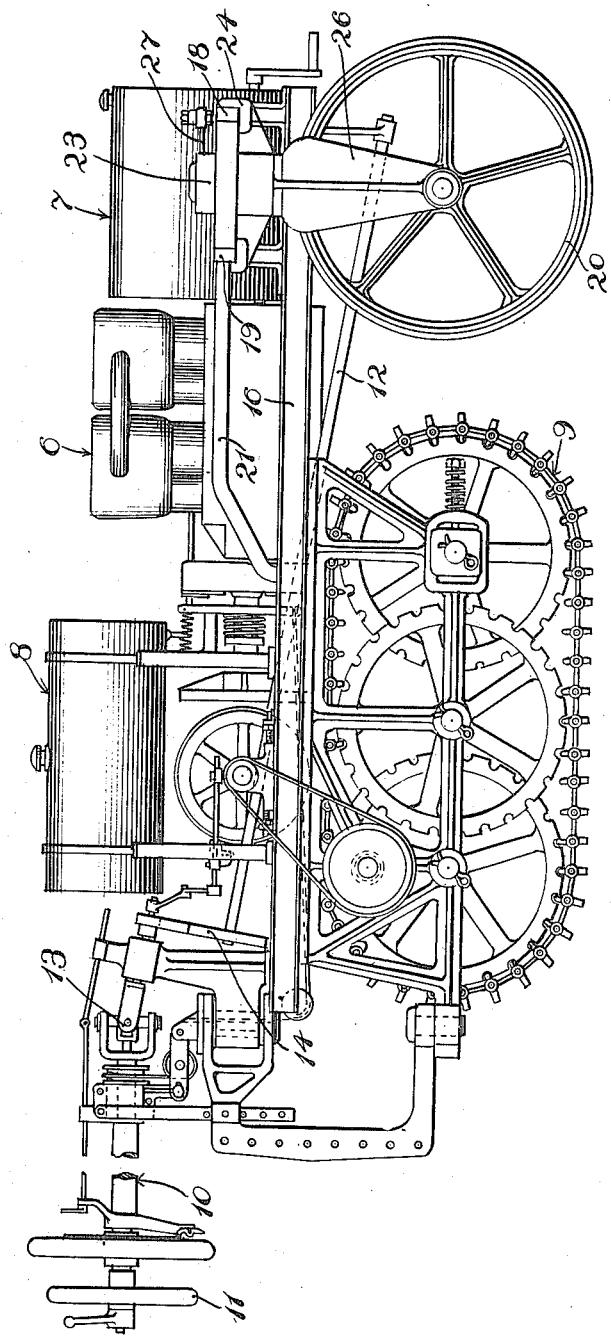

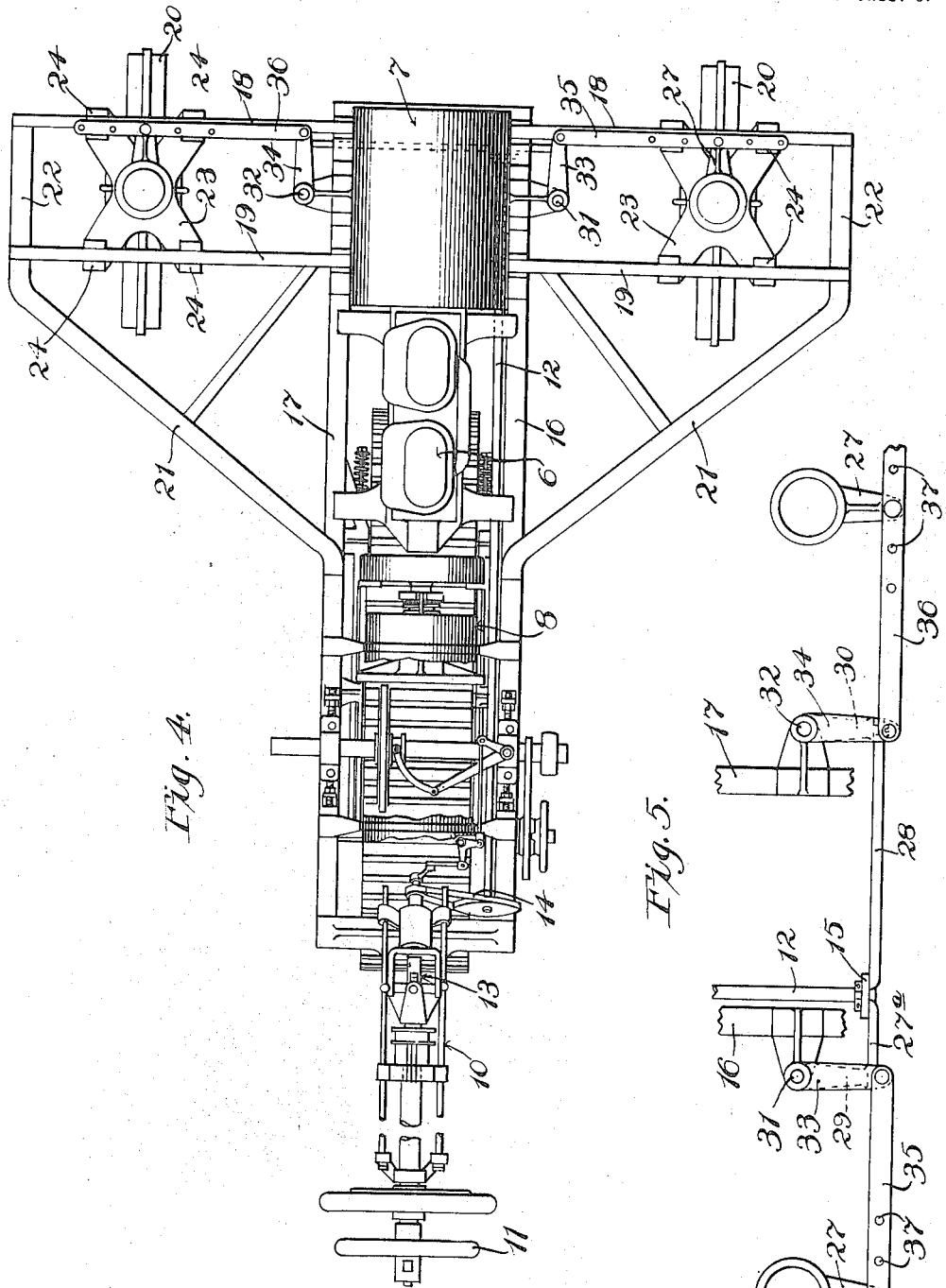

UNITED STATES PATENT OFFICE.

HARRY H. BATES, OF JOLIET, ILLINOIS, ASSIGNOR TO BATES MACHINE COMPANY, OF JOLIET, ILLINOIS, A CORPORATION OF ILLINOIS.

TRACTOR.

1,196,507.  Specification of Letters Patent.  Patented Aug. 29, 1916.

Original application filed January 16, 1914, Serial No. 812,506. Divided and this application filed July 1, 1915. Serial No. 37,512.

*To all whom it may concern:*

Be it known that I, HARRY H. BATES, a citizen of the United States, residing at Joliet, in the county of Will and State of Illinois, have invented certain new and useful Improvements in Tractors, of which the following is a specification.

The present invention relates to certain improvements in tractors, and particularly to improvements in that type or form of tractor which is intended for use on the farm for the pulling of farm implements and the like.

Still more particularly certain features of the invention adapt the tractor to use in the pulling of cultivators, although it will presently appear that certain features of the invention may be applied equally well to tractors not intended for such use, or for that matter not intended for use in pulling farm implements.

The present application is a division of my co-pending application for Letters Patent of the United States, Serial No. 812,506, filed by me January 16, 1914.

The tractor disclosed in the present application is so constructed that it may be caused to easily follow sharp bends or turns in the direction of travel. This feature will give it a facility and ease of operation rendering it useful in many classes of service from which other tractors are excluded. The tractor disclosed herein is peculiarly well adapted for use in connection with cultivators and the like. It is so constructed that it can be well used in the cultivation of rows of corn and other standing plants without injury to them. For this purpose the tractor is so constructed that it has a considerable clearance above the ground in those portions where such clearance is desirable for the purpose of permitting the tractor to ride over the tops of the growing plants. At the same time the tractor is so constructed that the distance laterally between the guide or steering wheels can be adjusted from time to time in order to conform the same as nearly as may be to the lateral distance between the rows of corn hills or other plants.

In the construction disclosed herein I have so correlated the parts that the aforementioned lateral adjustment of the steering wheels can be secured while at the same time maintaining the desired clearance above the ground, and also maintaining the ability to successfully and properly negotiate sharp bends or turns.

Another feature of the invention has reference to the provision of a frame of peculiar shape and construction so as to combine great mechanical strength and rigidity with lightness and cheapness of construction.

Other objects and uses will appear from a detailed description of the invention which consists in the features of construction and combinations of parts hereinafter described and claimed.

Referring to the drawings: Figure 1 shows a side elevation of the completed tractor to which the present invention relates; Fig. 2 shows a front elevation corresponding to Fig. 1; Fig. 3 shows a rear elevation corresponding to Fig. 1; Fig. 4 shows a plan view of the assembled tractor; and Fig. 5 shows a detail view of the link construction whereby the steering wheels are simultaneously controlled and whereby the distance between them may be adjusted from time to time according to requirements.

In the several figures the numeral 6 designates the engine and the numeral 7 the radiator for the cooling water. The tank 8 is provided for carrying fuel and lubricating oils. The particular construction illustrated makes use of a caterpillar 9 for securing traction on the ground, and as is best shown in Figs. 2 and 3 this caterpillar is mounted centrally and in the rear portion of the structure. The control device 10 extends rearwardly from the structure and carries the necessary controlling wheels and handles for controlling the fuel supply to the engine, the position of the spark, the position of the clutch transmission, and steering wheels. The detailed construction of these features forms the particular subject matter of the aforementioned application, Serial No. 812,506, and for that reason I will not herein describe the same in detail. I will, however, state that among the controlling elements is the steering wheel 11 which rocks a longitudinally extending shaft or rod 12, connection for this purpose being effected through the universal joint 13 and the belt or chain connection 14. The forward end of the rod 12 carries the upstanding lever arm 15 which is connected to the steering wheels in the manner presently to be described.

Referring particularly to Figs. 1 and 4 the main portion of the frame comprises the longitudinally extending sills 16 and 17 which are joined together periodically and at their front and rear portions so as to give them the desired relative position and stability. For example, the bed of the engine may be provided with crosswise extending portions which are connected to both of the sills and thus serve to join them together.

In the front portion of the frame are the sidewise projecting arms or beams 18 and 19 which have a sufficient length and sidewise projection to permit the steering wheels 20 to be set apart the maximum distance which will be desired. The brace bars 21 have their rear ends carried down and rigidly connected to the sills 16 and 17 and they have their front ends 22 extended straight forward and connected to the arms 18 and 19. These brace bars thus serve to rigidly space and support the ends of the arms 18 and 19 with respect to the sills.

Each pair of protruding arms 18 and 19 rests upon and is secured to a bracket 23 for one of the steering wheels. Each bracket in turn has the four blocks 24 which directly support the arms and may be connected to them. For this purpose each arm is provided with a plurality of perforations 25 and the blocks 24 have corresponding perforations so spaced that at each position of the bracket 23 all of its blocks 24 may be joined to the arms by means of bolts or pins extended through the proper perforations.

Each bracket 23 rests upon the corresponding fork 26, said fork having a pin extending up through the bracket and terminating in a control arm 27. The steering wheels are carried by the forks 26.

Referring particularly to Figs. 2 and 5 the upstanding lever arm 15 of the steering rod 12 has its upper end connected by the links 27ª and 28 with the lever arms 29 and 30. These lever arms in turn are secured to the rock shafts 31 and 32, the upper ends of which rock shafts carry the lever arms 33 and 34. These upper lever arms are connected by the links 35 and 36 to the arms 27, the rods 35 and 36 being provided with perforations 37 whereby such connection can be effected at any position of lateral adjustment of the steering wheels.

Reference particularly to Fig. 2 reveals the fact that the bars 18 and 19 project sidewise from the frame of the tractor at a considerable elevation above the ground, in fact at an elevation greater than the full diameters of the steering wheels. As a result the amount by which they clear the ground is greater than the diameter of the steering wheels so that the arms will pass over plants of considerable height. By running the tractor along with the caterpillar traveling between two plant rows, and by so positioning the steering wheels that they will travel outside of said plant rows it follows that the tractor may be successfully used for the cultivation of plants regardless of the distance between the plant rows. Furthermore this form of construction is such that the lateral distance between the steering wheels is quite large, thus giving the tractor great stability and resistance against overturning.

While I have herein shown and described only a single embodiment of the features of my invention, still it will be understood that I do not limit myself to the same, except as I may do so in the claims.

I claim:

1. In a tractor the combination with a prime mover, of a caterpillar mounted in the central rear portion of the tractor, an operative connection from the prime mover to the caterpillar, a draw bar connected to the rear portion of the tractor, a steering wheel on each side of the front portion of the tractor, and means permitting adjustment of the steering wheels toward and from the center line of the tractor.

2. In a tractor the combination with a prime mover, of driving means mounted in the central rear portion of the tractor, an operative connection from the prime mover to the driving means, a draw bar connected to the rear portion of the tractor, a steering wheel on each side of the front portion of the tractor, and means permitting adjustment of the steering wheels toward and from the center line of the tractor.

3. In a tractor the combination with a prime mover, of driving means mounted in the central rear portion of the tractor, an operative connection from the prime mover to the driving means, a draw bar connected to the rear portion of the tractor, a steering wheel mounted on each side of the front portion of the tractor, means permitting adjustment of the steering wheels toward and from the center line of the tractor, and means for simultaneously actuating the steering wheels in any adjusted position.

4. In a tractor the combination with a prime mover, of driving means mounted in the central rear portion of the tractor, an operative connection from the prime mover to the driving means, a draw bar connected to the rear portion of the tractor, a steering wheel mounted on each side of the front portion of the tractor, means permitting independent adjustments of the steering wheels toward and from the center line of the tractor, and means for simultaneously actuating the steering wheels in any adjusted position.

5. In a tractor the combination with a prime mover, of driving means mounted in the central rear portion of the tractor, an operative connection from the prime mover to the driving means, a draw bar pivotally connected to the rear portion of the tractor to swing about a vertical pivot, a steering wheel on each side of the front portion of the tractor, means permitting independent adjustment of the steering wheels toward and from the center line of the tractor, and means for simultaneously actuating the steering wheels in any adjusted position.

6. In a tractor the combination with a prime mover, of driving means mounted in the central rear portion of the tractor, an operative connection from the prime mover to the driving means, a draw bar connected to the rear portion of the tractor to swing about a vertical pivot, a steering wheel on each side of the front portion of the tractor, and means connecting each steering wheel to the tractor, said means extending sidewise at an elevation above the ground equal to or greater than the diameter of the steering wheels.

7. In a tractor the combination with a prime mover, of driving means mounted in the central rear portion of the tractor, an operative connection from the prime mover to the driving means, a draw bar connected to the rear portion of the tractor, a steering wheel on each side of the center line of the front portion of the tractor, and means for connecting each steering wheel to the tractor, said connecting means being at an elevation above the ground equal to or greater than the diameter of the steering wheels.

8. In a tractor the combination with a prime mover, of driving means mounted in the central rear portion of the tractor, an operative connection from the prime mover to the driving means, a draw bar connected to the rear portion of the tractor, a steering wheel on each side of the front portion of the tractor, and a connection from each steering wheel to the tractor, each such connection being mounted at an elevation above the ground equal to or greater than the diameter of the corresponding steering wheel.

9. In a tractor the combination with a prime mover, of driving means mounted in the central rear portion of the same, an operative connection from the prime mover to the driving means, a draw bar connected to the rear portion of the tractor, a steering wheel on each side of the front portion of the tractor, means for connecting each steering wheel to the tractor, said means permitting adjustment of each steering wheel toward and from the center line of the tractor, and each of said means being mounted at an elevation above the ground equal to or greater than the diameter of the corresponding steering wheel.

10. In a tractor the combination with a prime mover, of driving means mounted in the central rear portion of the tractor, an operative connection from the prime mover to the driving means, a draw bar connected to the rear portion of the tractor, a steering wheel on each side of the front portion of the tractor, means connecting each steering wheel to the tractor, said means permitting independent adjustment of the steering wheels toward and from the center line of the tractor, and each of said means being mounted above the ground at an elevation equal to or greater than the diameter of the corresponding steering wheel, and means for simultaneously actuating the steering wheels in any adjusted position.

11. In a tractor, the combination with the prime mover, of driving means mounted in the central portion of the tractor, an operative connection from the prime mover to the driving means, a draw bar connected to the tractor, and an adjustable connection from each steering wheel to the tractor permitting adjustment of each steering wheel toward and from the center line of the tractor.

12. In a tractor, the combination with the prime mover, of driving means mounted in the tractor, an operative connection from the prime mover to the driving means, a draw bar connected to the tractor, supporting means on each side of the tractor, and an adjustable connection from each supporting means to the tractor permitting adjustment of such supporting means toward and from the center line of the tractor, for the purpose of adjusting the gage between the supporting means.

13. In a tractor, having the controlling mechanisms for the major functions mounted to the rear thereof, the combination with a prime mover, of driving means mounted in the tractor, an operative connection from the prime mover to the driving means, a draw bar connected to the tractor, adjustable supporting means on each side of the tractor, and a connection from each supporting means to the tractor, each connection being mounted at an elevation above the ground greater than the shortest diameter of such supporting means.

14. In a tractor, the combination with a prime mover, of driving means mounted in the tractor, an operative connection from the prime mover to the driving means, steering wheels, and an adjustable connection from each steering wheel to the tractor permitting adjustment of each steering wheel toward and from the center line of the tractor.

15. In a tractor, the combination with a prime mover, of driving means mounted in the rear portion of the tractor, an operative connection from the prime mover to the driving means, a drawbar connected to the tractor, a steering wheel on each side of the tractor, and means permitting adjustment of the steering wheels toward and from the center line of the tractor.

16. In a tractor, the combination of a prime mover of driving means mounted in the tractor, an operative connection from the prime mover to the driving means, steering wheels, and connections extending sidewise from the tractor to the steering wheels, each connection being at an elevation above the ground equal to or greater than the diameter of the corresponding steering wheel.

17. In a tractor, the combination with a prime mover of driving means mounted in the rear portion of the tractor, an operative connection from the prime mover to the driving means, a steering wheel on each side of the front portion of the tractor, and means permitting adjustment of the steering wheels toward and from the center line of the tractor.

18. In a tractor, a pair of steering wheels, and an adjustable connection from one of said wheels to the tractor, permitting adjustment of the steering wheel toward and from the center line of the tractor while maintaining the steering function.

19. In a tractor, a steering wheel located at one side of the same, and means for permitting adjustment of said steering wheel sidewise with respect to the tractor while maintaining the steering function.

20. In a tractor, the combination of suitable driving means located in its central rear portion, and suitable steering means on each side of the front portion, each of said steering means being adjustable toward and from the center line of the tractor, and means for functioning both of the steering means in unison in any adjusted position, both of the steering means being symmetrically located with respect to the center line of the tractor.

21. In a tractor, the combination with a T-shaped frame, of suitable driving means located on the central arm of the frame, and suitable steering means located on each of the side arms of the frame, each of said steering means being adjustable along the length of the arm to which it is connected, and means for functioning each steering means in any adjusted position.

HARRY H. BATES.

Witnesses:
 THOMAS A. BANNING, Jr.,
 WM. P. BOND.